No. 644,977. Patented Mar. 6, 1900.
E. T. GILBERT.
COMBINED PASTE BOX AND DAUBER.
(Application filed Oct. 4, 1899.)
(No Model.)
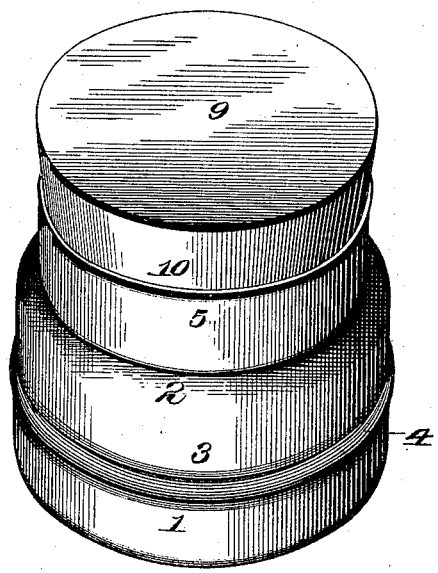
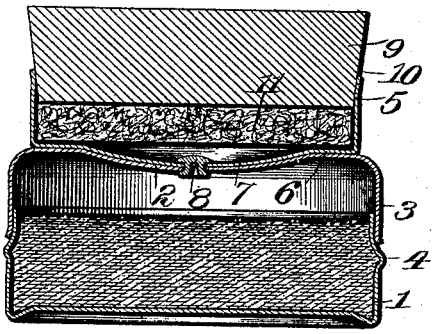
Witnesses:
Walter B. Payne
G. Willard Rich
Inventor:
Edgar T. Gilbert
by Chas. A. Church
his Attorneys.

UNITED STATES PATENT OFFICE.

EDGAR T. GILBERT, OF ROCHESTER, NEW YORK, ASSIGNOR TO THE E. T. GILBERT MANUFACTURING COMPANY, OF SAME PLACE.

COMBINED PASTE-BOX AND DAUBER.

SPECIFICATION forming part of Letters Patent No. 644,977, dated March 6, 1900.

Application filed October 4, 1899. Serial No. 732,562. (No model.)

*To all whom it may concern:*

Be it known that I, EDGAR T. GILBERT, of Rochester, in the county of Monroe and State of New York, have invented certain new and useful Improvements in a Combined Paste-Box and Dauber; and I do hereby declare the following to be a full, clear, and exact description of the same, reference being had to the accompanying drawings, forming a part of this specification, and to the reference-numerals marked thereon.

My present invention has for its object to provide a receptacle adapted particularly for containing a polishing substance or dressing for shoes and a device for applying the dressing to the article to be treated; and to this end it consists in certain improvements in construction and combinations of parts, all as will be hereinafter described and the novel features pointed out in the claims at the end of this specification.

In the drawings, Figure 1 is a perspective view of a device constructed in accordance with my invention; Fig. 2, a cross-sectional view thereof.

Similar reference-numerals indicate similar parts.

In the embodiment of my invention into a practical form I employ a suitable receptacle having the bottom portion or body 1 adapted to contain the wax dressing, oil, blacking, or other substance, provided with the cover 2, having the flange 3, adapted when applied to the body to engage upon the outer surface of the sides of the latter.

4 indicates an annular rib or projection formed upon the sides of the body to prevent the cover portion from being applied too tightly, so that its removal would be difficult.

Mounted upon the cover 2 is the dauber-receptacle, formed with the rim 5 on a bottom 6, having the convex portion 7, adapted to fit into a depression or concavity formed in the cover and secured to the latter by any suitable means, such as a rivet 8.

The dauber or device for applying the dressing embodies a circular handle of wood or other suitable material, as indicated by 9, having its sides tapering slightly, as shown at 10, and provided upon its lower surface with a covering 11 of felt or other soft fibrous material suitable for gathering up a quantity of the polish and distributing it when applied to the article. The tapering sides 10 of the dauber-handle permit the latter to fit tightly into the rim 5, and the dauber being contained in a separate receptacle the polishing material is prevented from drying and the felt portion is kept in a soft and pliable condition ready for instant use, and by reason of the simplicity of this construction devices such as I have described can be produced in an attractive form at a nominal cost, and by arranging the parts as shown the dauber and its receptacle form a convenient handle which may be advantageously employed in wrenching off the cover of the paste-box.

I claim as my invention—

1. The combination with a receptacle and a cover therefor, of a second receptacle on the cover, and a closure for the said receptacle having a dauber upon its inner face.

2. The combination with a receptacle having a cover, and a receptacle connected to the cover, of a closure for the latter receptacle having the tapering sides and provided upon its under surface with a covering of fibrous material.

3. The combination with a receptacle having a cover and the rim or flange 5 thereon, of a closure for the said receptacle having its sides tapered to fit within the rim, and a dauber 11 of fibrous material secured upon its lower end.

4. The combination with a receptacle containing a paste or similar material, and a cover therefor formed of sheet metal, of a superposed dauber-receptacle constructed of sheet metal secured to the cover by a single rivet passing through both parts, and a cover for the upper receptacle having a dauber secured to the under side thereof.

EDGAR T. GILBERT.

Witnesses:
G. WILLARD RICH,
GRACE A. RODA.